(12) United States Patent
Sandberg et al.

(10) Patent No.: US 8,468,970 B2
(45) Date of Patent: Jun. 25, 2013

(54) METHOD AND ARRANGEMENT FOR CONTROLLING THE MILKING BY A MILKING MACHINE

(75) Inventors: Ola Sandberg, Gnesta (SE); Eva Pia Sandstedt, legal representative, Gnesta (SE); Torbjorn Petterson, Gnesta (SE)

(73) Assignee: DeLaval Holding AB, Tumba (SE)

( * ) Notice: Subject to any disclaimer, the term of this patent is extended or adjusted under 35 U.S.C. 154(b) by 182 days.

(21) Appl. No.: 12/863,996

(22) PCT Filed: Jan. 16, 2009

(86) PCT No.: PCT/SE2009/050044
§ 371 (c)(1),
(2), (4) Date: Jul. 22, 2010

(87) PCT Pub. No.: WO2009/093966
PCT Pub. Date: Jul. 30, 2009

(65) Prior Publication Data
US 2011/0011343 A1    Jan. 20, 2011

(30) Foreign Application Priority Data
Jan. 24, 2008  (SE) ...................................... 0800173

(51) Int. Cl.
*A01J 3/00*   (2006.01)
(52) U.S. Cl.
USPC ..................................................... 119/14.02
(58) Field of Classification Search
USPC ................. 119/14.02, 14.41, 14.47
See application file for complete search history.

(56) References Cited

U.S. PATENT DOCUMENTS

| | | | |
|---|---|---|---|
| 4,011,838 A | | 3/1977 | Nordegren et al. |
| 4,190,021 A | | 2/1980 | Reisgies |
| 4,263,875 A | | 4/1981 | Maier et al. |
| 4,452,177 A | | 6/1984 | Plett |
| 4,483,272 A | * | 11/1984 | Tonelli ........................ 119/14.32 |
| 4,846,108 A | | 7/1989 | Meermoller |
| 5,218,924 A | * | 6/1993 | Thompson et al. ........ 119/14.02 |

(Continued)

FOREIGN PATENT DOCUMENTS

| | | |
|---|---|---|
| DE | 25 23 465 A1 | 12/1976 |
| DE | 34 19 615 A1 | 11/1985 |

(Continued)

OTHER PUBLICATIONS

International Search Report, dated Nov. 23, 2009, from corresponding PCT application.

(Continued)

*Primary Examiner* — Kimberly Berona
*Assistant Examiner* — Joshua Huson
(74) *Attorney, Agent, or Firm* — Young & Thompson (57) ABSTRACT

A method for controlling the milking by a milking machine includes, during an initial phase of the milking, increasing a milking vacuum and/or a maximum pulsation vacuum for the milking gradually from a first selected vacuum level (1L) towards a second selected vacuum level (2L) to thereby improve teat stimulation and decreasing the risk of a second milk letdown. When a second milk letdown (2ML) is detected, the maximum pulsation vacuum is preferably immediately lowered to a third selected vacuum level (3L), and is kept at that third selected vacuum level until a certain milk flow has been established, whereupon the pulsation vacuum level is then again increased gradually until the second selected vacuum level is reached.

12 Claims, 4 Drawing Sheets

U.S. PATENT DOCUMENTS

| | | | | |
|---|---|---|---|---|
| 5,443,035 | A | * | 8/1995 | Lind et al. .................. 119/14.02 |
| 5,568,788 | A | * | 10/1996 | van den Berg et al. .... 119/14.02 |
| 6,860,228 | B2 | * | 3/2005 | Maier et al. ................. 119/14.07 |
| 2005/0072362 | A1 | * | 4/2005 | Innings ....................... 119/14.08 |
| 2006/0243210 | A1 | * | 11/2006 | Kaever et al. ............. 119/14.02 |
| 2007/0157887 | A1 | * | 7/2007 | Fernandez ................ 119/14.49 |
| 2007/0193521 | A1 | * | 8/2007 | Alveby ....................... 119/14.02 |
| 2007/0209595 | A1 | * | 9/2007 | Umegard et al. .......... 119/14.02 |
| 2007/0245965 | A1 | * | 10/2007 | Petterson et al. .......... 119/14.47 |
| 2007/0283893 | A1 | * | 12/2007 | Schuster .................... 119/14.02 |
| 2009/0064936 | A1 | * | 3/2009 | Petterson .................. 119/14.02 |
| 2011/0232575 | A1 | * | 9/2011 | Duke .......................... 119/14.02 |

FOREIGN PATENT DOCUMENTS

| | | |
|---|---|---|
| DE | 36 24 478 A1 | 1/1988 |
| EP | 0 017 493 A1 | 10/1980 |
| EP | 1 312 256 A2 | 5/2003 |
| GB | 1 248 648 A | 10/1971 |
| GB | 1 592 408 A | 7/1981 |
| NZ | 203452 A | 6/1986 |
| NZ | 205360 A | 3/1987 |
| WO | 01/19169 A1 | 3/2001 |
| WO | 02/19804 A1 | 3/2002 |
| WO | 2006068581 A1 | 6/2006 |
| WO | 2007089185 A1 | 8/2007 |

OTHER PUBLICATIONS

New Zealand Examination Report dated Jul. 6, 2012, from corresponding NZ Patent Application No. 586308.

New Zealand Examination Report dated Jul. 6, 2012, from corresponding NZ Patent Application No. 600965.

* cited by examiner

METHOD AND ARRANGEMENT FOR CONTROLLING THE MILKING BY A MILKING MACHINE

TECHNICAL FIELD OF THE INVENTION

The present invention relates generally to dairy farming and to milking of dairy animals therein. Particularly, the invention relates to a method and an arrangement for controlling the milking by a milking machine.

DESCRIPTION OF RELATED ART AND BACKGROUND OF THE INVENTION

In modern dairy farm industry there are continuous research and development activities in order to improve the efficiency of various activities such as machine milking, which, inter alia, involves increased milk yield and reduced milking time, while, naturally, ethical aspects as well as animal care are considered.

Machine milking, as known in the art, generally utilizes teat cups and vacuum sources to perform the milking function. In such systems each teat is contained within a teat cup having a teat receiving liner, inside the teat cup next to the teat. A working vacuum is applied to the interior of each teat cup liner to draw the milk from the teat, with the teat liners periodically opened and collapsed by applications of a pulsating massage vacuum between the liner and the inside of the cup. This periodic working of the teat liners results in the periodic flow of milk from each teat into a receiving vessel, and constitutes the actual milking of the cow.

Milking preparation involves the first phases of milking in which the teat is stimulated in order to stimulate the milk ejection reflex and induce milk letdown.

GB 1 248 648 discloses a milking machine with a flow rate sensing device in a pipeline between the teat cup liners of the rear cups and a milk receiver held under partial vacuum such that the device operates a control means for varying the degree of vacuum between a working high vacuum and an idling low vacuum. Vacuum lines having different pressures (250 mms Hg and 550 mms Hg as given) are connected through hose pincher means to the milk receiver and through pulsators of differing frequency to the teat cups. When no milk flows through the device, the control valve, having one connection to vacuum and another to the atmosphere, causes pistons to operate the pincher means such that the milk receiver and teat cup liners are connected to the lower vacuum 550 mms Hg and the pulsator of lower frequency is connected to the teat cups, while during a flow of milk, impulses from the milk sensing device transmitted pneumatically to the control valve cause the pistons to move to change the positions of pincher means thereby connecting the higher vacuum to the milk receiver and the faster pulsator to the teat cups.

SUMMARY OF THE INVENTION

The milking machine of GB1 248 648 operates only with two different vacuum levels (250 mms Hg and 550 mms Hg) and the vacuum used at each instant depends on the milk flow. Hereby, a continuous operation may be obtained wherein the vacuum is changed stepwise between the two vacuum levels.

For some animals the milking preparation that is typically performed may not be sufficient to establish a high milk flow. For instance, some animals have a tendency of so-called second milk letdown, i.e. a drop in the milk flow rate when the cistern milk has been milked out and before the milk from the alveoli is let down. This leads inevitably to creeping of teat cups up on the teats of the milking animal and prolongs the milking time. It may also be unpleasant, or even harmful, to the milking animal.

It is therefore an object of the present invention to provide a method and an arrangement, respectively, for controlling the milking by a milking machine, by which method and arrangement the milking production can be increased and the animal care can be improved.

It is in this respect a particular object of the invention to provide such a method and such an arrangement, by which stimulation of the milk ejection reflex is improved and by which the occurrence of second milk letdowns is reduced.

It is a further object of the invention to provide such a method and such an arrangement, which are accurate, efficient, reliable, of low cost, and easy to implement.

These objects, among others, are attained by the methods, the computer program product, and the arrangement as defined in the appended patent claims.

According to a first aspect of the invention there is provided a method for controlling the milking by a milking machine comprising the step of: (i) during an initial phase, i.e. a milk flow increasing or stimulating phase, of the milking, increasing a milking vacuum and/or a maximum pulsation vacuum for the milking gradually from a first selected vacuum level towards a second selected vacuum level, to thereby improve teat stimulation and decrease the risk of a second milk letdown.

The gradual increase follows preferably a ramp function and lasts preferably for at least 10 seconds, and more preferably for at least 30 seconds. Typically, the gradual increase lasts not longer than about 90 seconds. Thus, the increase lasts for a considerable time giving the animal time to be stimulated and the milk letdown can be induced prior to reaching high vacuum levels. The risk of obtaining a second milk letdown is hereby reduced.

The milking vacuum and/or a maximum pulsation vacuum are thus initially increased gradually independently of the level of the milk flow.

If, however, a second milk letdown is detected, the maximum pulsation vacuum is preferably immediately lowered to a third selected vacuum level (which is lower than the milking vacuum), is kept at that vacuum level until a certain milk flow has been established, and is then again increased gradually until the second selected vacuum level is reached. Hereby, creeping of teat cups up on the teats of the animal is avoided and the milk from the alveoli is let down faster.

By means of the present invention the overall milk production can be optimized. The milk production can be maximized, while the animal care is maintained or even improved. Each milking animal is better stimulated in a stimulating phase of the milking, to induce milk letdown.

The invention differs considerably from GB 1 248 648 in that the milking vacuum and/or the maximum pulsation vacuum is increased gradually during an initial phase of the milking independently of the milk flow, whereas the vacuum of the milking machine disclosed in GB 1 248 648 is changed stepwise between two fixed levels depending on a sensed milk flow.

According to a second aspect of the invention there is provided an arrangement for implementing the above method. The arrangement comprises a vacuum control device provided for increasing the milking vacuum and/or a maximum pulsation vacuum gradually. The arrangement comprises preferably further a milk flow meter to measure the flow of milk produced during the milking and a timer or other time measuring device, by which the phases of the milking can be monitored.

Further characteristics of the invention and advantages thereof, will be evident from the detailed description of preferred embodiments of the present invention given hereinafter and the accompanying FIGS. 1-4, which are given by way of illustration only and thus, are not limitative of the present invention.

BRIEF DESCRIPTION OF THE DRAWINGS

FIGS. 3a-g illustrate a teat cup and a teat during a terminating phase of milking according to a yet further embodiment of the invention.

DETAILED DESCRIPTION OF EMBODIMENTS

Figure 1:
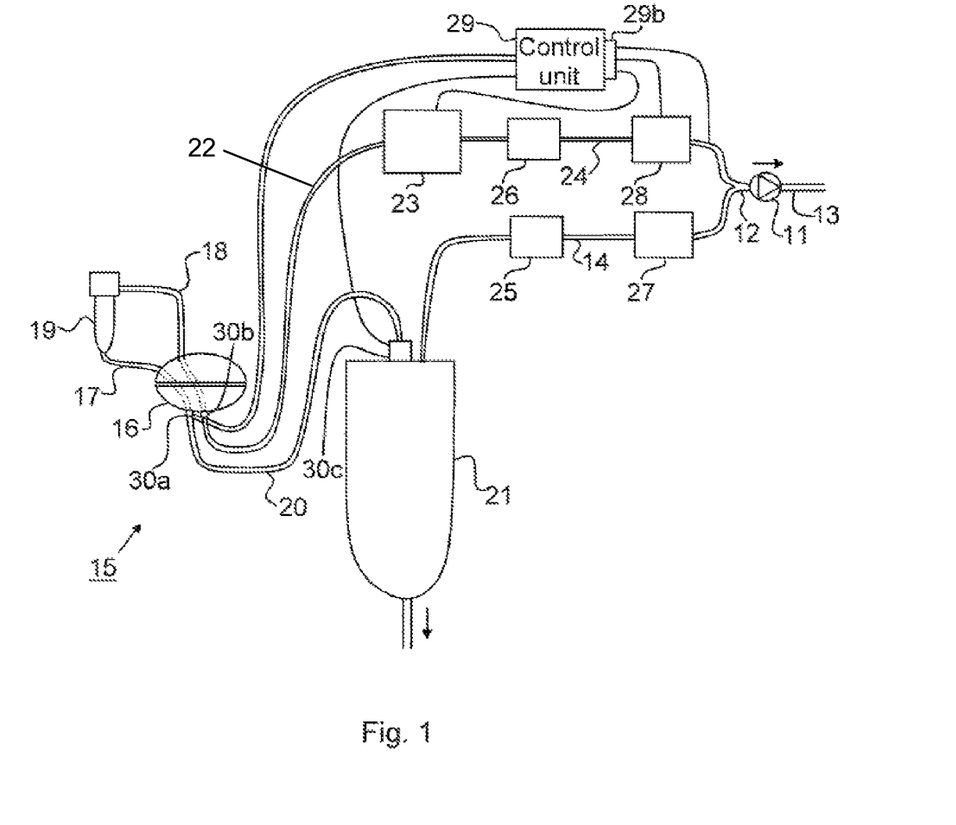
FIG. 1 illustrates schematically main components of a milking machine, wherein an embodiment of the present invention is implemented.

Main parts of a milking machine, which implements an embodiment of the invention, are disclosed in FIG. 1. A vacuum pump 11 has a suction side 12 and a pressure side 13, wherein the suction side 12 of the vacuum pump 11 is via a vacuum conduit 14 connected to a milking device 15.

The milking device 15 comprises a milking claw 16, which, via a milk tube 17 and a pulse tube 18, is connected to a teat cup 19 provided to be attached to a teat of an animal, such as a cow, to be milked. Of course, the milking device 15 may comprise more than one milking claw and each milking claw may be connected to more than one teat cup. In case the animals are cows four teat cups are needed for the milking of each animal.

The milking device 15 further comprises a receiving vessel 21, which is connected to the milking claw 16 via a further milk tube 20. The receiving vessel 21, which is connected to the vacuum conduit 14, may be provided with a separator for intermittently removing separated liquid and for preventing that liquid is introduced in the vacuum conduit 14.

Furthermore, a pulsator 23 is connected to the milking claw 16 via a pulse tube 22. The pulsator 23 may be connected, as illustrated, to the vacuum pump 11 via a further vacuum conduit in order to be capable of controlling the pulsation and milking vacuum levels independently of each other.

The vacuum pump 11 sucks a flow of air from the milking device 15 via the vacuum conduits 14 and 24. Hereby, a milking vacuum is produced in the teat cup 19 via the vacuum conduit 14, the receiving vessel 21, and the milk tubes 20 and 17. Similarly, a pulsating vacuum is produced in the annular space between a teat receiving liner and a teat cup shell of the teat cup 19 via the further vacuum conduit 24, the pulsator 23, and the pulse tubes 22 and 18. The pulsating vacuum varies during a pulsation cycle, for instance between atmospheric pressure and a maximum pulsation vacuum and causes the teat receiving liner 33 to periodically open and collapse to thereby massage the teat and stimulate milk ejection. By means of the applied milking and pulsation vacuums, milk is drawn from the teat of an animal to the receiving vessel 21.

In order to regulate the milking vacuum such that a preset level is maintained, and to regulate the pulsation vacuum such that the maximum pulsation vacuum in each pulsation cycle amounts to a preset level a first respective vacuum regulator 25, 26 is provided in the respective vacuum conduit 14, 24.

Each of the regulators 25, 26 may be any regulator known in the art, but is preferably a cost-efficient and reliable mechanic vacuum regulator. For instance, the vacuum regulators 25, 26 may each be comprised of a vacuum regulator of membrane type as being disclosed in detail in WO 02/19804 or in EP0017493, the contents of which being hereby incorporated by reference.

If no or very small pressure gradients occur in the milking machine the vacuum regulator 25, 26 may be dispended with.

Further, a second respective vacuum regulator or vacuum control device is provided in the respective vacuum conduit 14, 24 between the first respective vacuum regulator 25, 26 and the vacuum pump 11 in order to control, at each instant, the milking and maximum pulsation vacuums independently of each other. Each of the vacuum regulators is preferably formed by a valve arrangement 27, 28, a pressure sensor 30a, 30b located in the milking equipment 15, a common control unit 29, and signal connections interconnecting the valve arrangement 27, 28 with the common control unit 29 and the pressure sensor 30a, 30b with the common control unit 29. If so desired, a separate control unit may be provided for each vacuum regulator.

The milking and maximum pulsation vacuums are controlled by the control unit 29, and the pressure sensors 30a, 30b, which are arranged for repeatedly measuring the milking vacuum and the pulsation vacuum in the milking device 15 and for forwarding the measured pressure levels to the control unit 29, provides a feedback loop for the vacuum control.

It shall be appreciated that the vacuum regulators of the invention may be used for the control of the milking vacuum in more teat cups than one, such as in four teat cups, for the milking of an animal.

Alternatively, each of a plurality of teat cups is connected individually to a vacuum source via a respective milk tube, a respective receiving vessel, a respective vacuum conduit, optionally a respective first vacuum regulator, and a respective second vacuum regulator or control arrangement. Hereby, the preset milking and maximum pulsation vacuums may be controlled individually for each teat that is milked.

A milking machine of the above kind is disclosed in our co-pending Swedish patent application No. 0600199-4, the contents of which being hereby incorporated by reference.

Still alternatively, each of a plurality of teat cups is connected individually to a common receiving vessel by a respective milk line, which in turn is connected to a vacuum source. Each of the milk lines (or teat cups) is provided with a separately controllable regulator or valve means. Hereby, the preset milking and maximum pulsation vacuums may be controlled individually for each teat that is milked.

It shall be appreciated that the present invention may be implemented in any other kind of milking apparatus that provides individual control of the milking and maximum pulsation vacuums during milking. For instance, as an alternative to the valve arrangement 27, 28, the frequency controlled or other vacuum pumps may be provided for creating varying vacuum levels as desired.

According to this embodiment of the present invention the second vacuum regulator or vacuum control device arranged in the vacuum conduit 14 is, during a milk stimulating phase of a milking, provided for increasing a milking vacuum and/or a maximum pulsation vacuum for the milking monotonously and non-momentary from a first selected vacuum level towards at least a second selected vacuum level. The milking vacuum and/or a maximum pulsation vacuum are thus initially increased gradually independently of the level of the milk flow.

The gradual increase follows preferably a ramp function and lasts preferably for at least 10 seconds, and more preferably for at least 30 seconds. Typically, the gradual increase lasts not longer than about 90 seconds. Thus, the increase lasts for a considerable time giving the animal time to be stimulated and the milk letdown can be induced prior to reaching high vacuum levels. The risk of obtaining a second milk letdown is hereby reduced.

The gradual increase may be performed at a rate of between about 3 kPa/min and about 30 kPa/min, preferably between 5 kPa/min and 20 kPa/min, and most preferably at about 10 kPa/min.

The milk stimulating phase may be monitored by a timer or other time measuring device, which may be provided, e.g. as an integral function of the control unit 29.

FIG. 2 Embodiment

A method for controlling the milking of an animal according to an embodiment of the invention will next be described with reference to FIG. 2, which is a diagram of the milking vacuum and the maximum pulsation vacuum as functions of time in different phases of milking. The milk flow as a function of milking time is also indicated. The method is preferably implemented by a milking machine such as the one of FIG. 1.

Maximum Pulsation Vacuum

During an initial phase, i.e. a stimulating phase, of the milking, the maximum pulsation vacuum for the milking is increased monotonously and non-momentary from a first selected vacuum level 1L towards a second selected vacuum level 2L.

Preferably, the maximum pulsation vacuum is increased monotonously and non-momentary during the stimulating phase at a first speed during a first part 1P of the increase and at a second speed during a following part 2P of the increase, the second speed being higher than the first speed. This is indicated in FIG. 2 by a steeper slope of the maximum pulsation vacuum curve in the following part 2P of the increase as compared to the first part 1P thereof.

The maximum pulsation vacuum may first be increased at a first constant speed and then, when a milk flow rate as measured during the milking exceeds a first selected threshold value 1TH, preferably about 0.2-0.5 l/min, the maximum pulsation vacuum may be increased at a second constant speed, which is higher than the first constant speed.

The first selected vacuum level 1L is advantageously between about 25 and 35 kPa, and most advantageously about 30 kPa. The second selected vacuum level 2L is advantageously between about 45 and 55 kPa, and most advantageously about 50 kPa.

If a second milk letdown 2ML is detected during the milking, the maximum pulsation vacuum is immediately lowered to a third selected vacuum level 3L, which may be between about 25 and 40 kPa, and preferably about 35 kPa, i.e. a level lower than the vacuum level of the milking vacuum. The second milk letdown 2ML may be defined as e.g. when a milk flow rate as measured during the milking by a milk flow meter or other milk quantity measuring device 30*c*, which is provided, e.g. at the inlet to the receiving vessel 21, to measure the flow or instantaneous quantity of milk produced during the milking, falls below a second selected threshold 2TH, which may be given as a percentage drop, e.g. about 20%, of a maximum milk flow rate measured during a previous part of the milking.

The milking flow is kept at the third selected vacuum level 3L after having been lowered thereto and until a milk flow rate as measured during the milking exceeds a third selected threshold 3TH, which may be identical with the maximum milk flow rate measured during the previous part of the milking. The maximum pulsation vacuum, after having been kept at the third selected vacuum level 3L, is at this point again increased monotonously and non-momentary towards the second selected vacuum level 2L.

Then, the maximum pulsation vacuum is kept at the second selected vacuum level 2L during a main milking phase of the milking and the maximum pulsation vacuum is lowered to a fourth selected vacuum level 4L when the milk flow rate as measured during the milking falls below a fourth selected threshold 4TH. The fourth selected vacuum level 4L may advantageously be identical with the third selected vacuum level 3L, and the fourth selected threshold 4TH may be given as a percentage drop, e.g. about 20%, of a maximum measured milk flow rate during the main milking phase of the milking.

The maximum pulsation vacuum may, if desired, be lowered to a fifth selected vacuum level 5L when the milk flow rate as measured during the milking falls below a fifth selected threshold 5TH. Here, the fifth selected threshold 5TH is preferably close to, or somewhat higher than, the first selected threshold 1TH and the fifth selected vacuum level 5L is preferably identical with the first selected vacuum level 1L.

Milking Vacuum

The milking vacuum for the milking is increased monotonously and non-momentary together with the maximum pulsation vacuum from the first selected vacuum level 1L until a sixth selected vacuum level 6L, which preferably is between about 35 and 50 kPa, and most preferably about 44 kPa, is reached. The milking vacuum is kept at this vacuum level during the main milking phase of the milking and is lowered to a seventh selected vacuum level 7L when the milk flow rate as measured during the milking falls below a sixth selected threshold 6TH.

The seventh selected vacuum level 7L is advantageously identical with the fifth selected vacuum level 5L and the sixth selected threshold 6TH is advantageously identical with the fifth selected threshold 5TH.

Note specifically that if a second milk letdown 2ML is detected during the milking, the milking vacuum is kept unchanged in response to this detection in contrast to the maximum pulsation vacuum.

Figure 2:
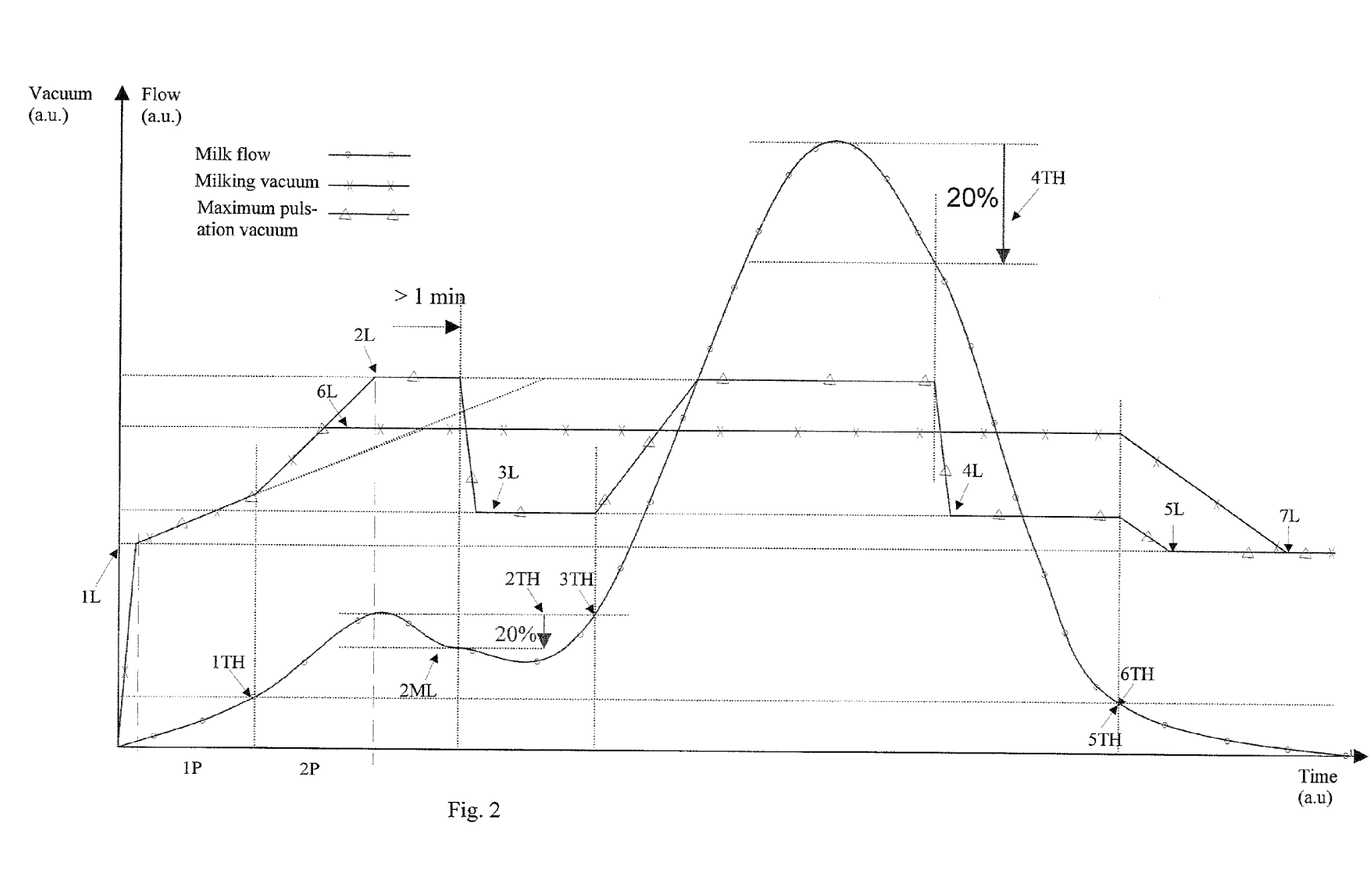
FIG. 2 is a diagram of the milking vacuum and the maximum pulsation vacuum as functions of time in different phases of milking according to a further embodiment of the invention. The milk flow as a function of milking time is also indicated.

The method according to the FIG. 2 embodiment of the invention provides for an efficient milking, at the same time as the milked animal is well treated. The main milking can be started earlier since the teat stimulation is improved, and the milking can be made faster since the risk of undesired second milk letdowns is decreased.

It shall be appreciated that the above figures are exemplary figures for a low line milking system. Should the milking system be a high line milking system or any other kind of milking system the figures may have to be altered accordingly.

Figures 3A, 3B, 3C, 3D, 3F, 3G:
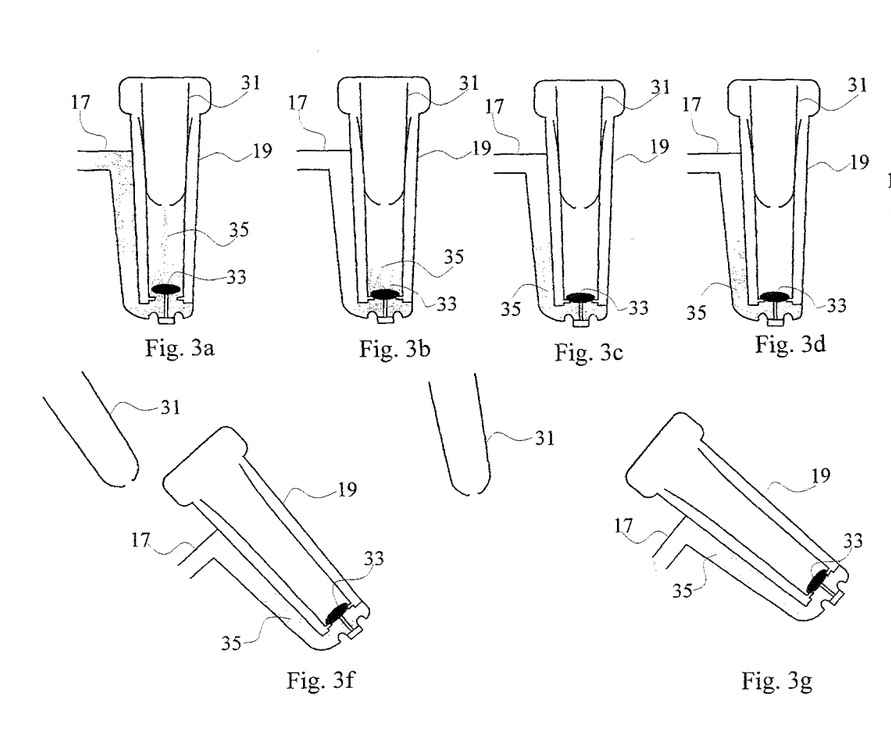
Figure 3E:
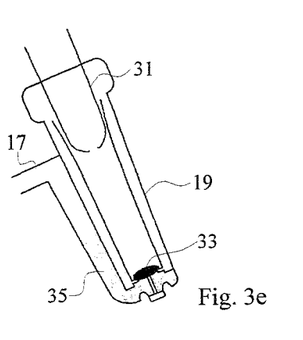
Figure 4:
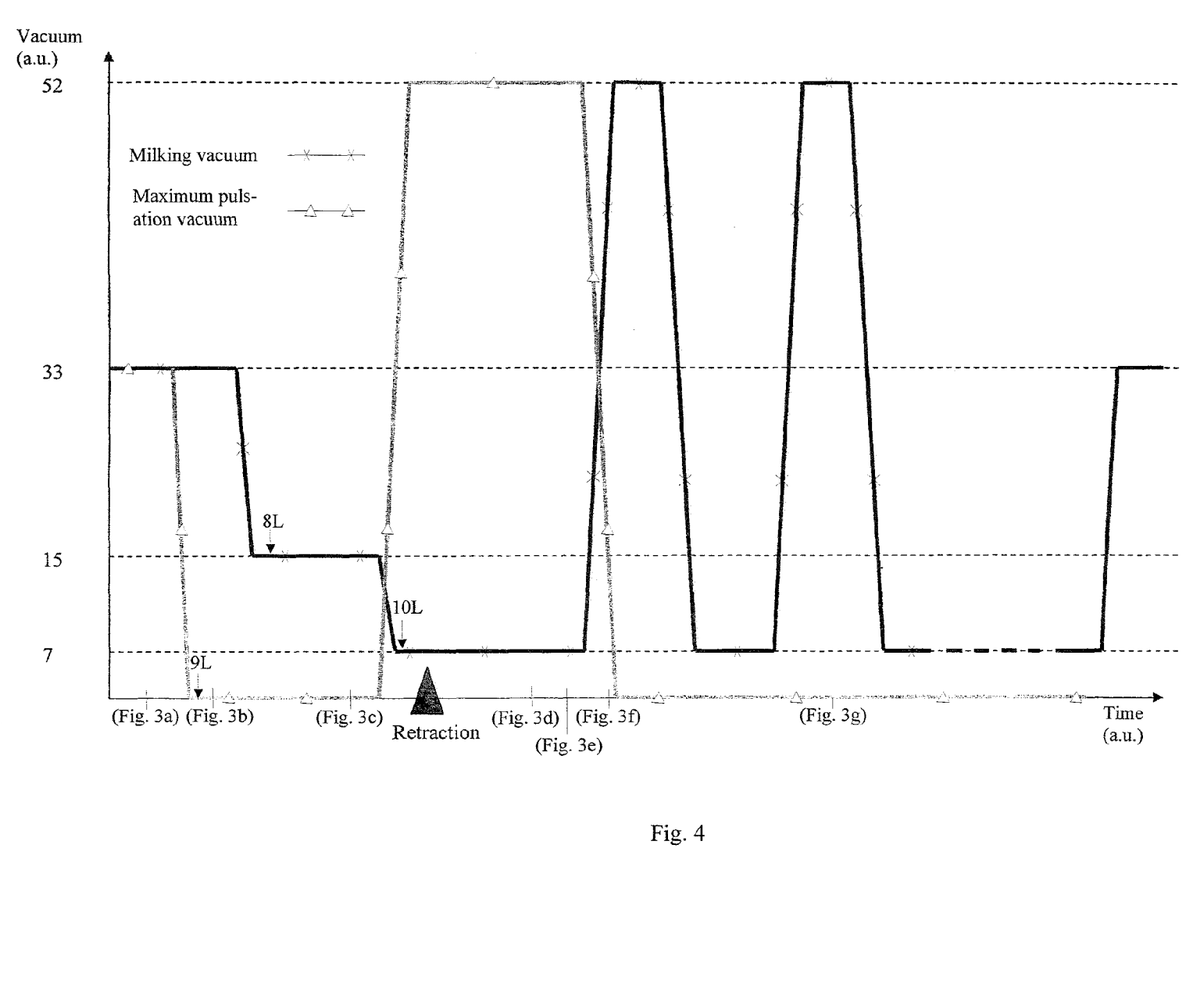
FIG. 4 is a diagram of the milking vacuum and the maximum pulsation vacuum as functions of time during the terminating phase as being illustrated in FIGS. 3a-g.

FIGS. 3-4 Embodiment

A method for controlling the vacuum levels during a terminating phase of a milking according to a further embodiment of the invention will next be described with reference to FIGS. 3*a-g* and 4. FIGS. 3*a-g* illustrate a teat cup 19 and a teat 31 during different stages of the terminating phase and FIG. 4 is a diagram of the milking vacuum and the maximum pulsation vacuum as functions of time during the terminating phase. The stages of the terminating phase, at which the teat cup 19 and the teat 31 are shown in FIGS. 3*a-g*, are indicated in FIG. 4 by referring to the FIGS. 3a-g at different positions along the time axis. The method is preferably implemented by a milking machine such as the one of FIG. 1.

The method has specifically been developed for a teat cup 19 having a valve 33 interconnected in the bottom thereof. The valve operates in the following manner: when the valve is at rest, i.e. when atmospheric pressures prevail in the teat cup and in the milk tube connected to the teat cup, the valve is closed and rests against the seat of the valve. When the milk hose is connected to vacuum and no teat is received in the teat cup, the valve is closed by a certain force. When a teat is entered into the teat cup and is sealed against the inner walls of the teat cup, the vacuum in the teat cup will increase, and at a certain vacuum level the valve will open.

During a terminating phase of the milking, the milking and maximum pulsation vacuums are kept at e.g. about 30 or 33 kPa such as at the first or third selected vacuum level of FIG. 2. The terminating phase may e.g. start at the right hand side of FIG. 2. The teat 31 is received by the teat cup 19 as being shown in FIG. 3a and a low flow of milk 35 is still obtained.

Next, the milking vacuum for the milking is lowered to an eighth vacuum level 8L, which is preferably between about 10 and 20 kPa, and most preferably about 15 kPa, and the maximum pulsation vacuum for the milking is lowered to a ninth vacuum level 9L, which is preferably about 0 kPa, in order to terminate the milking. These operations may be performed simultaneously, or one after the other as being indicated in FIG. 4. The resulting milking process is shown in FIG. 3b. The actual milking has been terminated, and the last amounts of milk 35 are drawn from the teat cup 19, through the valve 33 and into the milk tube 17. FIG. 3c shows a stage, wherein the teat cup 19 has been emptied from the last amounts of milk 35.

The milking vacuum is at this stage lowered to a tenth vacuum level 10L, which is preferably between about 4 and 10 kPa, and most preferably about 7 kPa, in order to prevent milk as milked from flowing backwards, i.e. back into the teat cup, and the maximum pulsation vacuum is increased, preferably to the second vacuum level 2L, to expand the teat receiving liner of the teat cup 19 to thereby facilitate take off of the teat cup 19. FIG. 3d illustrates the teat cup 19 and the teat 31 at this stage, whereas FIG. 3e illustrates the teat cup 19 and the teat 31 when the take-off of the teat cup 19 is about half-way through.

When the take-off is completed, the maximum pulsation vacuum for the milking is lowered again, preferably to about 0 kPa, and the milking vacuum is, one or two times (as illustrated), first increased, preferably to the second vacuum level 2L, and then lowered, to thereby removing residue milk from the teat cup 19 and the milk tube 17. FIGS. 3f and 3g illustrate the teat cup 19 and the teat 31 at the beginning of, and at a latter part, respectively, of this stage. The two increases of the milking vacuum should preferably be made with the teat cup 19 in different orientations in order to ensure that all residue milk is efficiently removed.

The above described method provides for a terminating phase of the milking and a take-off sequence that is fast, accurate, efficient, reliable, of low cost, and easy to implement. The milk is prevented from flowing backwards into the teat cup, the take-off is simplified, and the milk is removed efficiently from the teat cup.

If so desired, the methods and arrangements of the present invention can be implemented separately for each teat of the animal.

It shall be appreciated that the milking machine in which the present invention can be used encompasses those served by robots, those that are semi-automated, as well as those that are manually operated.

The invention claimed is:

1. A method for controlling milking by a milking machine comprising at least one teat cup (19) connected to a source of vacuum via a milk tube (17), wherein during milking a milking vacuum in said milk tube is kept at a selected vacuum level and a maximum pulsation vacuum is kept at a selected vacuum level, comprising the steps of:
  initially terminating said milking by
    i) lowering the milking vacuum in said milk tube to a first lowered milking vacuum level (8L), which is lower than a previous milking vacuum level in said milk tube during said milking, and
    ii) lowering the maximum pulsation vacuum to a first maximum pulsation vacuum level (9L), which is lower than a previous maximum pulsation vacuum level during said milking; and
  subsequently preventing backflowing of the milk from the milk tube back into the teat cup by lowering the milking vacuum in said milk tube to a second lowered milking vacuum level; and
  wherein after the step of initially terminating the milking, removing the teat cup from the animal by raising the maximum pulsation vacuum to a second maximum pulsation vacuum level (2L), the second maximum pulsation vacuum level being higher than the first maximum pulsation vacuum level.

2. The method of claim 1, wherein said second lowered milking vacuum level is between about 4 and 10 kPa.

3. The method of claim 1, further comprising, after the step of removing the teat cup, lowering the maximum pulsation vacuum to a third lowered maximum pulsation vacuum level, the third lowered maximum pulsation vacuum level being lower than the second maximum pulsation vacuum level.

4. The method of claim 3, wherein the third lowered maximum pulsation vacuum level is equal to the first lowered maximum pulsation vacuum level.

5. The method of claim 1, further comprising, after the step of removing the teat cup, removing residue milk from the teat cup and the milk tube by first increasing and subsequently lowering the milking vacuum one or two times.

6. The method of claim 1, wherein the step of removing the teat cup occurs at least partially concurrent with the step of preventing backflowing of the milk.

7. The method of claim 1, further comprising, after the steps of initially terminating the milking and subsequently preventing the backflowing of the milk, and after the teat cup is removed from the animal, removing residue milk from the teat cup and the milk tube by first increasing and subsequently lowering the milking vacuum in said milk tube one or two times.

8. The method of claim 1, wherein, during the step of terminating the milking, the milking vacuum in said milk tube is lowered to the first lowered milking vacuum level and the maximum pulsation vacuum is lowered to the first maximum pulsation vacuum level simultaneously.

9. The method of claim 1, wherein, during the step of terminating the milking, the maximum pulsation vacuum is initially lowered to the first maximum pulsation vacuum level and the milking vacuum is subsequently lowered to the first lowered milking vacuum level.

10. The method of claim 1, wherein the milking machine comprises a valve interconnected in a bottom portion of the teat cup, and wherein the lowering the milking vacuum to the second lowered milking vacuum level causes a pressure in the teat cup to rise about a selected pressure level, and causes the valve to automatically close.

11. The method of claim 1, wherein the valve is automatically closed when an interior of the teat cup is exposed to a pressure above the selected pressure level, and automatically opened when the interior of the teat cup is exposed to a pressure below the selected pressure level.

12. The method of claim 1, wherein the first maximum pulsation vacuum level is about 0 kPa.

* * * * *